(No Model.)

D. V. BROWN.
EYEGLASSES.

No. 348,449.  Patented Aug. 31, 1886.

WITNESSES
Will de Powell.
J. B. McGirr.

INVENTOR
Daniel V. Brown
By Conover Bros
Attorneys.

United States Patent Office.

DANIEL V. BROWN, OF PHILADELPHIA, PENNSYLVANIA.

EYEGLASSES.

SPECIFICATION forming part of Letters Patent No. 348,449, dated August 31, 1886.

Application filed April 30, 1886. Serial No. 200,709. (No model.)

*To all whom it may concern:*

Be it known that I, DANIEL V. BROWN, a citizen of the United States, residing at Philadelphia, in the county of Philadelphia and State of Pennsylvania, have invented certain new and useful Improvements in Eyeglasses; and I do hereby declare the following to be a full, clear, and exact description of the invention, reference being had to the accompanying drawings, which form part of this specification, in which—

Figure 1:
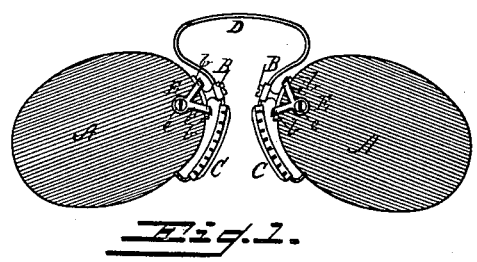
Figure 2:
Figure 3:

Figure 1 is a side elevation of a pair of eyeglasses with my improvements applied. Fig. 2 is a perspective of my improved form of strap. Fig. 3 is a plan of pattern or shape of strap previous to folding or bending.

My invention has for its object to provide a construction whereby the lenses of frameless eyeglasses will be very securely attached to the studs to which the nose-pieces and bow are fastened.

As heretofore constructed, the studs of eyeglasses have been formed or provided with straps, which were turned down over the edge of the lenses, said straps being in the form of narrow strips generally aligned with the major axis of the lenses. Such straps afforded but slight resistance against rotary movement of the lenses, and hence the latter had a tendency to move peripherally or circumferentially in the studs, thus disturbing the adjustment of the focal centers. To remedy this evil, I secure the studs to the lenses by means of flaring diagonal straps, or straps which are wider at the edge of the lens than at the fastening-point, and which may be made either integral with the studs or separately therefrom.

Referring to the accompanying drawings, which represent a pair of eyeglasses with my improvements applied thereto, A A are the lenses, which are frameless. B B are the studs, which form the media for connecting said lenses with the nose-pieces C C and the bow or spring D. Said studs are formed with lateral projections or feet $b\ b$, which rest upon the edges of the lenses.

E E are straps which pass over the feet $b\ b$, and are secured by screws $e\ e$ to the lenses. These straps, instead of being, as heretofore, single narrow pieces or strips, are formed with diagonal braces $e'\ e'$, which flare apart so as to obtain bearings on the edge of the lenses on either side of the centers of the studs B B. By means of this construction a very firm fastening is secured, and the movement of the lenses in the studs, or of the latter upon the former, is avoided. As already remarked, the straps may be made separately from the studs, and in such case they may be cut from sheet metal and of the pattern shown in Fig. 3, being then of diamond shape or approximately diamond shape, with the heads $e^2\ e^2$ on two points, forming bosses to receive the screw $e$, by which they are fastened to the lenses. The stud B being passed up through the opening $e^3$, the plate is bent down or doubled up to form a groove or channel for the reception of the edge of the lens. The latter is then placed in position and the fastening-screw inserted. If desired, the strap E may be made integral with the base-plate or feet $b\ b$ of the stud B, and in such case the central opening, $e^3$, may be dispensed with. The outer edges of the straps will, however, in this case flare or spread, so that the straps shall be wider where they bear on the edge of the lens than at the end where the fastening-screws enter, and will have bearings on the edges of the lenses on either side of the center of the stud.

What I claim as my invention is—

1. The combination, with the lenses A A and studs B B, of straps E E, which bear upon the edges of the lenses on either side of the studs, substantially as shown and described.

2. The combination, with lenses A A, and studs B B, having laterally-extending feet $b\ b$, which bear upon the edges of said lenses, of flaring straps E E, passing over said feet on either side of the studs, substantially as shown and described.

3. The combination, with the lenses and stud, of a strap having flaring branches which pass on either side of said stud, substantially as shown and described.

In testimony that I claim the foregoing I have hereunto set my hand this 22d day of March, 1886.

DANIEL V. BROWN.

Witnesses:
EDWARD B. FOX,
R. DALE SPARHAWK.